May 12, 1925.  
L. H. LIEBSCHER  
EDGE TRIMMER FOR LAWNS  
Filed March 1, 1924
1,537,537
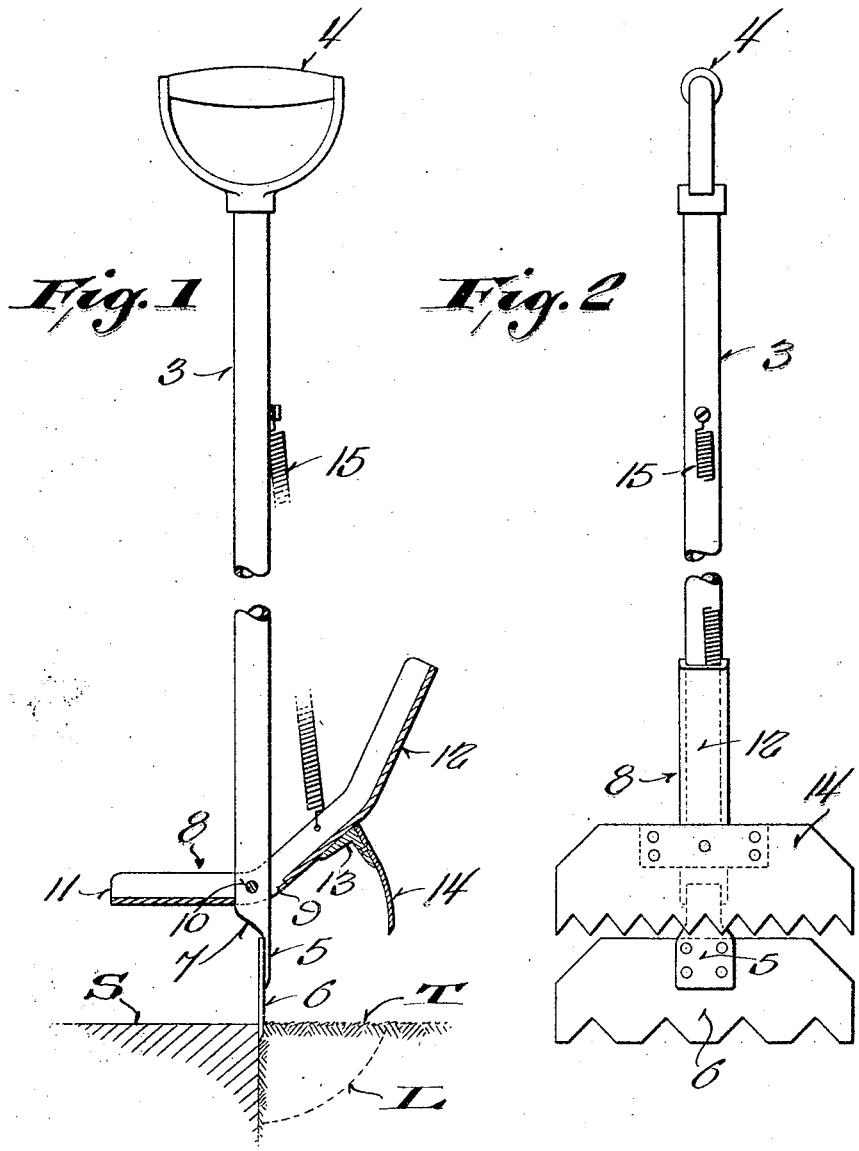

Patented May 12, 1925.

1,537,537

UNITED STATES PATENT OFFICE.

LEO H. LIEBSCHER, OF MILWAUKEE, WISCONSIN.

EDGE TRIMMER FOR LAWNS.

Application filed March 1, 1924. Serial No. 696,240.

*To all whom it may concern:*

Be it known that I, LEO H. LIEBSCHER, a citizen of the United States, and resident of Milwaukee, in the county of Milwaukee and State of Wisconsin, have invented certain new and useful Improvements in Edge Trimmers for Lawns; and I do hereby declare that the following is a full, clear, and exact description thereof.

This invention pertains to edge trimmers for lawns and has primarily for its object to provide a simple efficient and durable tool for evenly trimming the edge of a lawn adjacent the sidewalk, curb or drive.

A further object is to provide a tool of the above character which gauges the width and depth of the cut, thereby insuring an even trough or edge.

Another object resides in the provision of a trimming tool adapted to both sever the turf from the edge of the sidewalk and to cut away the severed portion.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1 is a side elevational view of a tool constructed in accordance with the present invention, parts being broken away and in section to more clearly illustrate the structural details.

Figure 2 is a front elevational view of the same.

Referring now more particularly to the accompanying drawings, that form of the invention illustrated comprises a handle 3, preferably of tubular construction, provided with a hand grip 4 at its upper end, while its lower end is flattened out at 5 to receive the blade 6, which is secured to the portion 5 by rivets or other suitable means. In forming the flattened end 5, one side of the tubular handle 3 is provided with an inclined surface 7, the purpose of which will be explained further on in the specification.

Pivotally secured to the handle 3, adjacent its lower end, is a lever 8, preferably in the form of a channeled member, provided with an opening 9 in its bottom for the reception of said handle, while the sides of the lever engage the handle and are secured thereto by means of the pivot pin 10 passing therethrough. As best illustrated in Figure 1, it will be seen that the lever 8 is pivoted intermediate its ends,—the short arm 11 extending to one side while the elongated arm 12 is inclined upwardly in the opposite direction when the lever is in its normal position, as illustrated in the drawing. Secured to the under side of the arm 12, by means of an angular bracket 13, riveted or otherwise suitably fastened thereto, is a cutter blade 14, which, because of the rotary cutting action of the blade, is preferably formed on a curve about a horizontal axis parallel to the pivotal axis of the lever 8. For the purpose of holding the lever 8 in its normal position, with the arm 12 raised, a spring 15 is connected thereto with its opposite end fastened to the handle 3.

In Figure 1 the tool is illustrated in connection with a portion of the concrete sidewalk S and the turf T, both of which are shown in section, while the dotted line L indicates the approximate line of travel of the cutter blade 14 during its cutting operation.

In the operation of the tool, the blade 6 is positioned between the sidewalk and the turf, as illustrated in Figure 1. This accomplished, it will be readily seen that the arm 11 serves as a support for the foot used in forcing the blade 6 downward, and in addition thereto, will also act as a stop, limiting the insertion of the tool. As the blade 6 is forced downwardly between the sidewalk and the turf, the inclined surface 7 will eventually engage the edge of the sidewalk causing the blade 6 to be cammed or forced away from the side, thus loosening and separating the turf from the sidewalk. The operator then places his foot on the arm 12 of the lever 8 and, upon exerting downward pressure, rocks the lever forcing the knife 14 into the turf along the line indicated, cutting out the portion separated from the sidewalk. When the foot is removed from the arm 12, the spring 14 will return the same to its normal position and the tool is removed and again inserted for the next cut.

From the foregoing it will be seen that a very simple tool has been provided which is easily operated and leaves the turf with the desired even edge or trough between it and the sidewalk.

I claim:

1. An edge trimmer of the character described comprising, a handle, means carried by the handle for insertion between the walk and the turf, a lever pivoted on said handle, a cutter blade carried by said lever, and a spring for retaining the lever in its normal position.

2. An edge trimmer of the character described comprising, a handle, means carried by the handle for insertion between the walk and the turf, a lever pivoted intermediate its ends to said handle, a cutter blade carried by one of the arms of said lever, the other arm of said lever projecting to serve as a foot rest, and means for limiting the rotary movement of said lever in one direction.

3. An edge trimmer of the character described comprising, a handle, means carried by the handle for insertion between the walk and turf, a lever pivoted on said handle and a cutter blade carried by said handle, said cutter blade being formed on an arc about a horizontal axis parallel to the pivotal axis of said lever.

4. An edge trimmer of the character described comprising, a handle, a blade carried by said handle for insertion between the walk and the turf, a lever pivoted intermediate its ends to said handle, a cutter blade carried by one of the arms of said lever, said cutter blade being formed on an arc about a horizontal axis parallel to the pivotal axis of said lever, the other arm of said lever serving as a foot rest, and to limit the depth of insertion of the blade between the walk and turf, means for limiting movement of the lever in one direction, and a spring for retaining the lever in its normal position.

In testimony that I claim the foregoing I have hereunto set my hand at Milwaukee, in the county of Milwaukee and State of Wisconsin.

LEO H. LIEBSCHER.